3,755,451
EXCHANGE REACTIONS OF OCTADIENYL ESTERS WITH ACTIVE HYDROGEN COMPOUNDS

Abraham N. Kurtz and Melvin L. Farmer, Charleston, and Kenneth E. Atkins, South Charleston, W. Va., assignors to Union Carbide Corporation, New York, N.Y.
No Drawing. Filed Apr. 29, 1970, Ser. No. 33,065
Int. Cl. C07c *49/12*
U.S. Cl. 260—593 R                  2 Claims

ABSTRACT OF THE DISCLOSURE 3-octa-1,7-dienyl acetate is readily isomerized to 1-octa-2,7-dienyl acetate in the presence of palladium catalysts alone and at a rapid rate when a tertiary amine is added. This same allylic isomerization occurs with butenyl acetates. Allylic alcohols such as 2-octa-1,7-dienol also undergo this isomerization.

1-acetoxy-2,7-octadiene and 1-octa-2,7-dienol are each intermediates in the process for the production of linear octanol.

The catalyst system is also useful for replacing the functional groups in an allylic system. For example, octadienyl esters can be converted into (1) octadienyl amines via reaction with primary or secondary amines, (2) octadienyl ethers via reaction with alcohols, (3) other octadienyl esters by reaction with other carboxylic acids and (4) used to extend a carbon chain when reacted with compounds containing an activated carbon-hydrogen bond.

---

This invention relates to a method for making octyl esters, alcohols, ethers, and amines and to a method for making octadienyl esters, alcohols, ethers, and amines useful for making octyl esters, alcohols, ethers, and amines.

Octyl alcohols are useful as intermediates for making plasticizers, such as dioctylphthalate which is widely used as a plasticizer for vinyl resins. 2-ethylhexanol is the octyl alcohol most widely used industrially for this purpose, but n-octyl alcohol would be preferably for this use because plasticizers made from it are superior in their effectiveness. However, there has been some difficulty in finding a satisfactory commercial synthesis for n-octanol. The Zeigler synthesis of alcohols from ethylene gives a mixture of products of varying chain length, and heptene-1-required for an Oxo synthesis of octanols is not readily available anl, furthermore, the Oxo processes also produce branched-chain alcohols. A recent selective synthesis of a linear eight carbon chain via telomerization of butadiene with a carboxylic acid using palladium, platinum or ruthenium complex catalysts could provide an economical synthesis of the alcohol. The reaction yields octadienylcarboxylates which can be hydrolyzed and hydrogenated to yield octanol. A disadvantage of this process is that the butadiene telomerization with carboxylic acid (e.g., acetic acid) yields a mixture of 1-octa-2,7-dienyl acetate (I) and 3-octa-1,7-dienyl acetate (II). The alcohol resulting from I is a 1-octanol and the alcohols resulting from II is

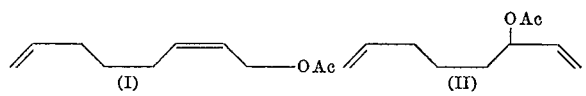

3-octanol. The 1-octanol yields the phthalate diester of preference while secondary alcohols, such as 3-octanol, do not give plasticizer esters as useful as those made with primary alcohols. The purity of the alcohol is also important because mixtures of the phthalate esters do not have properties as good as those of di-n-octylphthalate.

Obviously, for the butadiene telomerization route to be used the 1- and 3-octadienyl acetate isomers must be separated and the 1-octadienyl acetate used in the reaction sequence. The 3-octadienyl acetate made in the telomerization reaction would decrease the efficiency of the process to the desired 1-octadienyl acetate.

According to this invention it has been found that under appropriate catalytic conditions the 3-octadienyl acetate can be isomerized to 1-octadienyl acetate. The catalyst used is one selected from group VIII of the periodic table, e.g., palladium, platinum, etc. These group VIII metals have been reported to isomerize olefins but there is no report of their catalysis of allylic rearrangements. This technique enables the 3-octadienyl acetate to be effectively used to make n-octanol and improves the efficiency of the process.

The reaction is generally applicable to allylic compounds regardless of the nature of the allylic substituent. For example, another promising technique for the synthesis of n-octanol utilizes the telomerization of butadiene with water in the presence of carbon dioxide to yield octadienol. Just as in the carboxylic acid instance a mixture of 1- and 3-isomers results; 1-octa-2,7-dienol and 3-octa-1,7-dienol. The compounds are separated and the 3-octadienol is isomerized to 1-octadienol using group VIII metals, especially palladium and platinum as catalysts.

In addition to the $C_8$ compounds mentioned, lower carbon number allylic compounds such as those containing allyl and butenyl radicals can be isomerized using these catalysts. For example, 1-buten-3-ylacetate is converted to 2-buten-1-ylacetate (crotylacetate).

In all instances, the allylic compounds are converted to their thermodynamic equilibrium mixtures and the desired compound is separated by standard techniques. The less desirable isomer is then available for further isomerization to the desired product.

The isomerization may be carried out smoothly in the presence or absence of solvent. In the modification wherein solvent is employed; solvents that are suitable are those capable of dissolving the reactants, catalyst, and catalysts modifier and are inert to the reactants and the products prepared therefrom under the stated condition of the reaction. Exemplary solvents include dialkylethers, such as diethylether, dibutylether, methylethylether, and the like; alkylarylethers, such as anisole, phenylbutylether and the like; cyclic ethers, such as tetrahydrofuran, dioxane, dioxolane, and the like; lower alkyl ethers of polyhydric alcohols or polyoxyalkylene glycols, such as ethylene glycol dimethyl ether, diethyleneglycoldimethylether, tetraethyleneglycoldimethylether, glycerol triethyl and the like; aromatic hydrocarbons, such as benzene, toluene, ethylbenzene, xylene, triethylbenzene, and the like; ketones, such as acetone, methylethylketone and the like; esters, such as ethylacetate, butylacetate, methylpropionate, phenylacetate, methylbenzoate, methyl-2-phenylacetate, methylcyclohexanecarboxylate and the like; and N,N-dialkylalkanoic acid amides, such as N,N-dimethylformamide, N,N-dimethylacetamide and the like; and nitriles, such as acetonitrile, propionitrile, benzonitrile, and the like.

Under certain conditions, secondary and tertiary alcohols, such as t-butanol, iso-propanol and the like, can be used as solvents for isomerization reactions.

Reactive hydrogen containing compounds (HX) can be used as the solvent if the functional radical (X) to which the hydrogen is attached is the same as the functional group being isomerized, e.g., acetic acid as the solvent

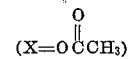

for the octadienyl acetate isomerization.

When certain tertiary amines are added to the reactant mixture, a remarkable increase in the rate of isomerization occurs. For example, when 2-(N,N-dimethylamino) ethanol was added to an octadienyl acetate isomerization, the rate of reaction increased almost fourfold to the equilibrium mixture of 1- and 3-acetate.

The amines that can be used as promoters for these isomerization reactions are trisubstituted with no hydrogens attached to the nitrogen atom. These tertiary amines are generally fairly strong organic bases and are illustrated by: trialkylamines, e.g., trimethylamine, triethylamine, tri-n-octylamine, dimethyldodecylamine and the like; functionally substituted trialkylamines, such as 2-(N,N-dimethylamino)ethanol, 3-(N,N-dimethylamino)-1-propanol, 2-(N,N-dimethylamino)ethyl acetate, N-methyl diethanolamine, triethanolamine, 2-(dimethyl amino)ethyl ethyl ether, 2-(dimethylamino)-ethyl phenyl ether and the like; trisubstituted cyclic amines or diamines, such as N-alkylpiperidines, (i.e., N-methyl piperidine, N-ethyl, N-octyl, N-benzyl, etc.), N-alkylpyrrolidines, N-alkylmorpholines, N-alkyl tetrahydro-o-isoxazines, N-alkyl decahydroquinolines, N-alkyl octahydroindoles, N,N'-dialkylhydroquinolines, N-alkyl octahydroindoles, N,N'-dialkyltetrahydrooxadiazenes and the like; trisubstituted acyclic aliphatic diamines, such as N,N,N',N'-tetramethyl-1,3-butanediamine, N,N,N',N' - tetramethyl-1,2-ethanediamine, N,N,N',N'-tetramethyl-1,6-hexane diamine and the like. In general, the amines require a basicity at least greater than that of pyridine, $K_b$—$1.7 \times 10^{-9}$.

The isomerization of allylic alcohols, such as 3-octa-1,7-dienol to 1-octa-2,7-dienol is improved by the addition of carbon dioxide to the reaction mixture. For example, an isomerization in dioxane solvent was only 20 percent completed after two hours at 100° C., while a comparable experiment with carbon dioxide present was essentially completed in one hour.

The solvents applicable for isomerization of the allylic alcohols in the presence of carbon dioxide are essentially the same as those applicable for the other isomerization reactions. The presence of a tertiary amine and/or carbon dioxide is useful in providing an increase in the isomerization rate. These amines are the same as those previously mentioned to increase the rate of carboxylate isomerization.

Whenever the isomerization of octadienylcarboxylates, alcohols, ethers or amines is conducted in the presence of a reactive hydrogen attached to a radical X (HX), where X is not the same as the organic radical being isomerized, an exchange reaction can take place. For example, when the isomerization of octadienyl acetate is performed using morpholine as the solvent,

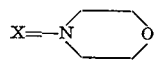

the primary product of the reaction is N-octa-2,7-dien-1-ylmorpholine. Similarly with diethyamine $$(X=N-(C_2H_5)_2),$$

the product is octa-2,7-dien-1-yldiethylamine, and with n-butyl amine both mono and diocta-2,7-dien-1-yl butylamine are obtained.

Other X groups which participate in the reaction are: X=OR, e.g., reaction in the presence of ethanol yields ethoxyoctadienes;

e.g., propionic acid transesterifies with octadienylacetate to give octadienylpropionates;

where Y and Z represent electron withdrawing groups, such as —$CO_2R$, CN, $C_6H_5$,

and the like, e.g., 2,4-pentanedione reacts to yield both mono and bis 3,3-(octa-2,7-dien-1-yl)-2,4-pentanedione. With all the active H-containing compounds, octa-1,7-dien-3-ylacetate, octa-2,7-dien-1-ylacetate, octa-2,7-dien-1-ol, or octa-1,7-dien-3-ol yield the carbon octadienylated products.

Octadienylethers, such as octa-2,7-dien-1-ylethyl ether, yield the same "octadienylated" 2,4-pentanediones when used in this reaction.

These reactions are generally applicable to allylic alcohols, esters, ethers and amines, such as allyl alcohol, allyl acetate, crotyl alcohol, crotyl acetate, 1,4-butendiol, allyl ethyl ether, crotyl ethyl ether, allyldiethylamine, diallylamine, triallylamine and N,N-diethy octa-2,7-dien-1-ylamine to yield the corresponding allyl, crotyl, and octadienyl derivatives as outlined above. Another novel facet of this system is that the exchange of allylic esters with active methylenes and alcohols is facilitated by the presence of a tertiary amine. For example, using the catalyst at 85° C., allyl acetate and 2,7-pentanedione reacted to provide 37 percent of 3-allyl-2,4-pentanedione and 4 percent of 3,3-bis(allyl)-2,4-pentanedione in one hour. In the presence of N-methylmorpholine a 66 percent yield of 3-allyl-2,4-pentanedione and an 18 percent yield of 3,3-bis(allyl)-2,4-pentanedione was realized in the same reaction period.

The products of this novel process are useful in a variety of applications. The remaining unsaturated linkages can be hydrated or hydroxylated to form useful alcohol derivatives from which polyesters and polyethers can be prepared. The amine moieties are oxidized to form useful amine N-oxides or reacted with mineral acids or alkyl halides to yield quaternary ammonium salts. The ethylenic linkages can serve as dienophiles in Diels-Alder condensation reactions or as reactive sites in polymerization or copolymerization processes, and can be epoxidized to form epoxy derivatives which react with a variety of curing agents to form epoxy resins.

Certain of the compounds resulting from the exchange reaction of this invention are disclosed and claimed as new compositions in copending application Ser. No. 33,064, filed Apr. 29, 1970 by W. E. Walker and R. M. Manyik.

Conveniently, the catalyst system which is use for the telomerization of butadiene with acetic acid as described in J. E. McKeon and D. R. Bryant application Ser. No. 660,226, now U.S. Pat. 3,534,088 filed Aug. 14, 1967 is also active for promoting the exchange reaction. Thus, a crude reaction mixture from the reaction of butadiene with acetic acid can be treated with a compound XH and the exchanged product formed directly (e.g., morpholine can be added to form N-(octa-2,7-dien-1-yl) morpholine). In some instances, the XH compound can be charged to the initial reaction mixture and the exchanged octadienyl derivative is isolated at the end of the reaction. For example, butadiene, acetic acid and diethylamine with catalyst yields octadienyldiethylamine and only traces of octadienylacetate. The reaction of diethylamine with butadiene in this catalyst system yields octadienyldiethylamine at a slower rate. Under these same conditions with a tertiary amine only present, the reaction of butadiene and acetic acid to yield octadienylacetate is quite rapid. The exchange reaction of octadienylacetate with diethylamine under these conditions is extremely facile.

Examples of the allylic compounds which can participate in the isomerization and exchange reactions are allyl alcohol, its esters, and its ethers, such as allyl acetate, allyl benzoate, allyl propionate, allyl pivalate, allyl 2-ethylhexanoate, allyl methylphthalate, allyl p-chorobenzoate, allyl p-methoxybenzoate, allyl p-nitrobenzoate, allyl methyladiphate, diallyladipate, diallyl phthalate, allyl cyclohexanecarboxylate, allyl acrylate, allyl cyclohexenecarboxylate, allyl alkyl ethers (e.g., allyl methy ether, allyl ethyl ether, allyl isopropyl ether, ally cycohexyl ether, allyl t-butyl ether), allyl alkenyl ethers (e.g., diallyl ether, allyl butenyl ether, allyl cycohexenyl ether, allyl hexenyl ether, allyl hexadienyl ether, allyl bicycloheptenyl ether, allyl octadienyl ether), allyl aryl ethers (e.g., allyl phenyl ether, allyl tolyl ether, ally napthy ether, allyl p-methoxy phenyl ether, allyl m-methoxyphenylether, allyl o-methoxyphenylether, allyl p-chlorophenylether, allyl p-cyanophenylether, allyl p-nitrophenyl ether) and the like; crotyl alcohol, and its ester and ether derivatives as described above; but-1-en-3-ol and its ester and ether derivatives; methallyl alcohol and its ester and ether derivatives; 2- and 3-substituted butenol derivatives, such as 2- or 3-alkyl 2-buten-1-ol, 2- or 3-aryl 2-buten-1-ol and their ester and ether derivatives, 1,4-but-2-endiol, hex-3-en-1,5-diol and their ester and ether derivatives, cycloalkenyl alcohols, such as cyclopent-2-en-1-ol, cyclohex-2-en-1-ol, cyclohex-1-en-1-ylcarbinol, 1,2-bis hydroxymethyl-cyclohex-1-ene, cyclopent-1-en-1-ylcarbinol and their ester and ether derivatives as above; allylic systems containing further sites of unsaturation, such as octa-2,7-dien-1-ol, octa-1-,7-dien-3-ol, 2,7-dimethyl-2,6-octadien -1-ol (gerniol), 3,7-dimethyl-1,6-octadiene-3-ol (linalool), penta-2,4-dien-1-ol and their ester and ether derivatives as described above, and the like.

Examples of amines which serve as a source of allylic moiety are allyl amine, diallylamine, triallylamine, dimethylallylamine, diethylallylamine, N-allylmorpholine, cyclohexylallylamine, phenylalyamine, methylallylamine, crotylamine, diethylcrotylamine, N-crotylmorpholine, methyl octa-2,7-dien-1-ylamine, methyl octa-1,7-dienylamine, diethylocta-2,7-dienylamine, diethylocta-1,7-dien-3-ylamine, N-octa-2,7-dien-yl-morpholine, N,N-bis(octa-2,7-dienyl)analine, N-octa-2,7-dien-1-ylpiperidine, N-(3,7-dimethylocta-2,7-dien-1-yl) morpholine, diethyl-(3,7-dimethylocta-2,7-dien-1-yl)amine, N-(2,7-dimethylocta-2,7-dien-1-yl)morpholine, diethyl-(2,7-dimethylocta-2,7-dien-1-yl)amine, 1,4-but-2-endiamine, N,N'-dimethyl-1,4-but-2-ene diamine, and the like.

A major advantage here is that a large unit to make n-octanol from the butadiene telomerization sequence could also supply quantities of a number of other octadienyl compounds via these exchange reactions.

Examples of various XH compounds that can enter into this palladium or platinum catalyzed exchange reaction with allylic substituents include: primary and secondary aliphatic amines, such as methylamine, ethylamine, n-butylamine, isobutylamine, 3-aminomethylheptane, n-dodecylamine, dimethylamine, dipropylamine, piperidine, methylhexylamine, cyclohexylamine, N-ethylcyclohexylamine, N-octyldodecylamine, 1-aminodecalin, pyrrolidine, and the like; aryl amines, such as aniline, benidine, p-phenylenediamine, α-naphthylamine; alkarylamines and aralkylamines, such as benzylamine, N-methylbenzylamine, o-toluidine, p-toluidine, β-phenylethylamine, N-methylaniline, 1,2,3,4-tetrahydroquinoline, 2-aminotetralin, N-propylbenzylamine, N-butylaniline, N,N'-bis(ethylamino)-benzene, 2,2-bis(4-aminophenyl)propane, 2,6-dimethylaniline, N,N-bis(3-aminophenyl)methylamine and 3-phenyl pyrrolidine, and the like; and at least partially-aromatic amines, which are substituted hydrocarbon amines, such as aminopyridines, m-methoxy aniline, p-dimethylamino-aniline, phenoxymethylamine; N-methyl-p-ethoxyaniline, N-(3-chloropropyl)benzylamine, p-trichloromethyl aniline; primary and secondary amines which contain carbon-carbon unsaturation, such as allylamine, diallylamine, pyrrole, indole, N-methylallylamine, N-propylallylamine, 1-cyclohex-3-enylmethylamine, 2-bicyclo 2.2.1 hept-5-enylmethylamine, 1-octa-2,7-dienylethylamine, 3-octa-1,7-dienylethylamine, N-(1-octa-2,7-dienyl)aniline, N-(3-octa-1,7-dienyl)aniline, 2methylpyrrole, 3-methylindole, and the like; hydrocarbon polyamines as exemplified by ethylenediamine, trimethylenediamine, 1,4-diaminohexane, diethylenetriamine, N,N-bis(2-aminoethyl)methyl- amine, 1,8-bis(4-aminobutylamine)octane, 1,4-bis(aminomethyl)cyclohexane, N,N'-dimethyl-1,3-diaminopropane, and the like; and substituted hydrocarbon mono- and polyamines, e.g., monoethanolamine, diethanolamine, 2-acetoxyethanolamine, diethanolamine, 2-acetoxyethylamine, bis(2-acetoxyethyl)amine, 2-methoxyethylamine, 2-propoxy-1,3-diaminobutane, N-methyl-4-acetoxybutylamine, bis(2-methylaminoethyl)ether, 3 - chloropropylamine, N-methyl-N-2-acetoxyethyl amine, and the like.

Alcohols which will participate in the exchange reaction include: aliphatic primary, secondary and tertiary alcohols, such as methanol, ethanol, 1-butanol, 1-hexanol, 2-ethylhexanol, dimethylcarbinol (iso-propanol), dibutylmethylcarbinol, ethylbutylcarbinol, dibutylcarbinol, cyclohexylmethylcarbinol, trimethylcarbinol (t-butanol), dimethylethylcarbinol, dibutylmethylcarbinol, dimethylhexylcarbinol, and the like; cycloalkanyl alcohols, such as cyclohexylalcohol, cyclopentylalcohol, decalinol, bicycloheptanol, and the like; aliphatic alcohols substituted with a heteroatom containing cyclic group, such as tetrahydropyran-2-methanol, and the like; primary, secondary and tertiary alcohols containing aryl groups, such as benzyl alcohol, 2-phenylethanol, tetralol, naphthylcarbinol, 2-naphthylethanol, phenylmethylcarbinol, naphthylmethylcarbinol, diphenylcarbinol, dimethylphenylcarbinol, methylethylphenylcarbinol, phenol, naphthol, and the like; halogenated alcohols, such as 1,1,1-trifluoroethanol, 1H, 1H pentadecafluorooctanol, and the like; di- and polyols, such as ethylene glycol, diethylene glycol, 1,2-propylene glycol, 1,5-pentanediol, dipropylene glycol, glycerol, 1,2,6-hexanetriol, poly-propylene glycol, and the like; partial ethers of the alkylene glycols and polyalkylene glycols, such as 2-methoxyethanol, 2-butoxyethanol, diethylene glycol monomethylether, and the like; alcohols containing carbon-carbon unsaturation, such as allyl alcohol, octadienyl alcohol, bicyclohept-5-en-2 - ol,2 - bicyclohept - 5-enylmethanol, 1-cyclohex-2-enol, 3-cyclohexen - 1 - methanol, 1,4-but-2-endiol, and the like.

The carboxylic acids which participate in the exchange reaction include; the alkanolic acids, such as acetic acid, chloroacetic acid, propionic acid, butyric acid, valeric acid, pivalic acid, hexanoic acid, heptanoic acid, dodecanoic acid, and the like; the cycloalkanecarboxylic acids, such as cyclohexanecarboxylic acid, cyclopentanecarboxylic acid, 2-bicycloheptanecarboxylic acid, and the like; aromatic acids, such as benzoic acid, naphthoic acid, phenylacetic acid, and the like; monocarboxylic acids with carbon-carbon unsaturation, such as acrylic acid, butenoic acid, oleic acid, undecanoic acid, cinnamic acid, sorbic acid, and the like; half esters or half alkylamides of dicarboxylic acids and the dicarboxylic acids themselves, such as malonic acid, phthalic acid, isophthalic and/or terephthalic acid, adipic acid, azelaic acid, maleic acid, and the like.

The compounds containing activated carbon-hydrogen bonds which can participate in the allylic exchange reaction are presented by the general formula

where X, and Y and Z are electron withdrawing groups selected from the group consisting of nitro, (NO$_2$), nitrite, (O—N=O), cyano (CN), carboxy (COOH), carboxylate (COOR), carboxaldehyde 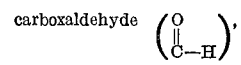

carbonyl 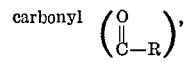

nitroso (NO), phenyl (C$_6$H$_5$), trihydrocarboyl ammonium (R$_3$N$^+$), substituted phenyl, and halogens, such as Cl, F, or Br; and where Z additionally can be selected from the group consisting of hydrogen, alkyl or alkenyl groups, such as methyl, ethyl, isopropyl, cyclohexyl, tert-butyl, phenyl, substituted phenyl, allyl, butenyl, octadienyl, cyclohexenyl, bicycloheptenyl, and the like. Some examples of these compounds are listed below. These are intended to illustrate the compounds applicable in the invention and are not intended to define the limits of the invention. Such compounds are 2,4-pentanedione (acetylacetone), ethyl acetoacetate, diethylmalonate, malononitrile, phenylacetonitrile, ethyl cyanoacetate, ethyl phenylacetate, dinitromethane, p-tolylacetonitrile, p-nitrophenylacetonitrile, p-chlorophenylacetonitrile, p - bromophenylacetonitrile, p-methoxyphenylacetonitrile, p-dimethylaminophenylacetonitrile, as well as the corresponding meta and ortho derivatives, phenyl-2-propanone (phenylacetone), p-methoxyphenyl-2-propanone, p-nitrophenyl-2-propanone, p-chlorophenyl - 2 - propanone, p-tolyl-2-propanone, p-dimethylaminophenyl-2 - propanone, as well as the corresponding ortho and meta derivatives, 1,3-diphenyl-1,3-propanedione, phenylnitromethane, bis-p-nitrophenylmethane, 3-methyl - 2,4 - pentanedione, 3-ethyl-2,4-pentanedione, 3 - isopropyl - 2,4 - pentanedione, 3-phenyl-2,4-pentanedione, 3 - cyclohexyl - 2,4 - pentanedione, 3-allyl-2,4-pentanedione, 3 - (octa-2,7 - dien - yl)-2,4-pentanedione, 3 - (octa - 1,7 - dien - 3 - yl) - 2,4-pentanedione, 3-butenyl - 2,4 - pentanedione, 2 - methyl malonitrile, 2-ethyl malononitrile, 2-isopropyl malononitrile, 2-cyclohexyl malononitrile, 2-phenyl malononitrile, 2-allyl malononitrile, 2-butenyl malononitrile, 2-(octa-2,7-dien-1-yl)malononitrile, 2-(octa-1,7-dien-3 - yl) malononitrile, ethyl 2-methyl acetoacetate, ethyl 2-ethylacetoacetate, ethyl 2-isopropyl acetoacetate, ethyl 2-allyl acetoacetate, ethyl 2-butenylacetoacetate, ethyl 2-(octa-2,7-dien-1-yl) acetoacetate, ethyl 2-(octa-1,7-dien-3-yl) acetoacetate, triacetylmethane, 1,3-indandione, and the like.

While the catalysts for the reaction may be selected from compounds of platinum, palladium, ruthenium and the like, the catalyst of preference is a palladium compound used either with or without modifiers, such as trihydrocarbylphosphines. For example, when 3-octadienylacetate is heated at 100° C. with acetic acid and palladium acetylacetonate and triphenylphosphine, the equilibrium mixture of about 75 percent 1-octa-dienylacetate and 25 percent 3-octadienylacetate is achieved in four hours.

When this novel process is conducted as a homogeneous liquid phase reaction, the active catalyst species can be derived from a catalyst compound which is soluble in the reaction mixture or which can be soluble therein by reaction with one of the components of the said mixture.

Illustrative palladium compounds which may be used are those such as: palladium (II) acetylacetonate, palladium olefin complexes, such as 1,5-cyclooctadiene palladium (II) chloride, π-allylpalladium acetate, endodicyclopentadiene-palladium (II) bromide and the like; complexes of palladium with trihydrocarbylphosphines and arsines, e.g., bis(triphenylphosphine)palladium (II) acetate, bis(p-methoxyphenyl) palladium (II) acetate, tetrakis-(triphenylphosphine) palladium (O), tetrakis(dimethylphenylphosphine) palladium (O), tetrakis(trinaphthylphosphine) palladium (O), tetrakis(tri-p-methoxyphosphine) palladium (O), tetrakis(diphenyl p-chlorophenylphosphine) palladium (O), bis(triphenylphosphine), palladium (II) nitrate, bis(triphenylarsine) palladium (II) chloride, bis(dimethylphenylphosphine) palladium (II) chloride, bis(trinaphthylphosphine) palladium (II) chloride, [1,2-(bis-diphenylphosphine)-ethane] palladium (II) chloride, bis(tributylarsine) palladium (II) bromide, bis(trioctylphosphine) palladium (II) nitrate and the like; complexes with phosphates and phosphites, e.g., bis(trioctylphosphite) palladium (II) nitrate, tetrakis(triphenylphosphite) palladium (O), bis(triphenylphosphite) palladium (II) chloride and the like: complexes with tridentate ligands of the type outlined above may also be used. Various other palladium compounds which may be used include palladium (II) alkanoates, e.g., palladium (II) acetate, bis(triphenylphosphine) palladium carbonate, palladium (II) butyrate, palladium (II) hexanoate and the like; the palladium (II) cycloalkanecarboxylates, e.g., palladium (II) cyclohexanecarboxylate and the like; palladium (II) arylcarboxylates, e.g., palladium (II) benzoate, palladium (II) monomethylphthalate and the like; complexes with alkyl and aryl nitriles, e.g., bis(benzonitrile) palladium (II) chloride, bis(proprionitrile) palladium (II) cayanide and the like; as well as palladium compounds, such as palladium (II) bromide, palladium (II) chloride, palladium (II) nitrate, palladium (II) sulfate, ammonium chloropalladite, potassium chloropaladite, sodium chloropalladite and the like.

Paladium metal in an active form, such as palladium black or palladium on a support, such as charcoal, may be used as the source of the catalytic palladium species. Palladium complexes can be generated in situ by reaction of such active forms of palladium with species, such as allyl bromide (to give π-allypalladium bromide), or trihydrocarbylphosphines, trihydrocarbylphosphites, or trihydrocarbylarsines or mixtures thereof.

For the sake of brevity, this descriptive list has been limited to compounds of palladium. Analogous compounds of platinum are well known and are also effective as catalysts in this process. Ruthenium compounds also have some activity in this invention and are generally added as a ruthenium (III) compound. For several reasons, among them being convenience, the preferred metal is palladium.

While any one of the palladium or platinum compounds previously described can be used as catalysts, improved results can be obtained by the addition of certain ligands as catalyst modifiers, in the cases of compounds which do not contain such ligands. These ligands or modifiers can be reacted with the metal-containing compound in a separate reaction and added to the reaction mixture or can be added directly to the reactant mixture to yield an active catalyst species in situ. Even in the cases of the performed complexes, increased amounts of ligand can result in an improved process.

The modifiers can be selected from the trihydrocarbyl phosphines (the trialkyl phosphines, e.g., tri n-octylphosphine, tributylphosphine, dimethyl-n-octylphosphine, tricyclohexylphosphine and the like; triarylphosphine, e.g., triphenylphosphine, tritolylphosphine, diphenyl p-chlorophenylphosphine, tris(p-methoxyphenyl) phosphine and the like; the tertiary alkarylphosphines, e.g., diphenylethylphosphine, dimethylphenylphosphine, bis(diphenylphosphino)methane, 1,2 - bis(diphenylphosphino)ethane and the like; the trihydrocarbylarsines (the trialkyl, triaryl and alkaryl arsines illustrated by substitution of As for P in the compounds described above) and the trihydrocarbylphosphites (trialkylphosphites, e.g., triethylphosphite, tributylphosphite, tricyclohexylphosphite, tri(2-ethylhexyl) phosphite, tris(2-hydroxyethyl) phosphite, tris-(2-ethoxyethyl) phosphite and the like; as well as certain bicyclic phosphites of the general structure shown below.

Compounds with both phosphorus to oxygen and phosphorus to carbon bonds, such as diethoxyphenylphosphine

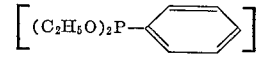

ethoxydiphenylphosphine, dimethoxyphenylphosphine, diisopropoxyphenylphosphine, bis(2 - butoxy)phenylphosphine, diphenoxyethylphosphine and the like can be used.

Also bicyclic compounds can be used, such as

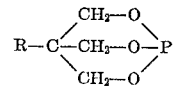

where R can represent a hydrogen; or an alkyl group, such as methyl, ethyl, nonyl and the like; or an aryl group, such as phenyl, tolyl, naphthyl and the like; or a TABLE I—Continued

| Example No. | HOAc | DMEA [a] | Weight Pd(AcAc)₂ [b] | Grams PPh₃ | Other | 1-octa-2,7-dienyl acetate | 3-octa-1,7-dienyl acetate | Equilibration time (hr.) [c] |
|---|---|---|---|---|---|---|---|---|
| 24 | 1.5 | 1.5 | | 0.013 | [h] 0.019 | | 1.0 | >27 |
| 25 | 1.5 | | 0.115 | 0.013 | [i] 0.01 | | 1.0 | >27 |
| 26 | 1.5 | | 0.015 | 0.013 | [i] 1.5 | | 1.0 | >16 |
| 27 | 1.5 | 1.5 | 0.015 | 0.013 | | | 1.0 | [j] 8 |
| 28 | 1.5 | 1.8 | 0.015 | | [g] 0.018 | 1.2 | | >24 |
| 29 | 1.5 | 1.5 | 0.015 | | | | 1.0 | [j] >2 |
| 30 | 4.0 | | | | [k] 0.358 | | 3.0 | N.r. |
| 31 | 4.0 | 4.0 | | | [k] 0.358 | | 3.0 | N.r. |
| 32 | 1.5 | 1.5 | | | [l] 0.2919 | | 3.0 | N.r. |

[a] Dimethylethanol amine.
[b] Palladium acetylacetonate.
[c] N. r.=No reaction. Other times indicate that run was carried to equilibration mixture, except where > sign is used.
[d] Sodium acetate.
[e] Acetate ester of DMEA.
[f] H₂O.
[g] Triphenylphosphite.
[h] Platinum acetylacetonate.
[i] Dabco.
[j] Run at room temperature.
[k] Cupric acetate.
[l] Cuprous acetate.

EXAMPLE 33

A mixture of 5.0 of 1-octa-2,7-dienylacetate and 10 ml. of benzene was heated in the presence of 0.10 g. of palladium chloride at 70° C. for two hours and an equilibrium mixture of the acetates was achieved (27% 3-octa-1,7-dienylacetate and 73% 1-octa-2,7-dienylacetate). The same mixture was obtained upon reaction starting with the 3-octa-1,7-dienylacetate.

EXAMPLE 34

A mixture of 1.5 g. acetic acid, 1.5 g. N,N-dimethylethanol amine, 3.0 g. 2-buten-1-ylacetate, 0.015 g. palladium acetylacetonate and 0.13 g. of triphenylphosphine were heated under nitrogen at 100° C. for 1.5 hours to give a mixture containing 16% 1-buten-3-ylacetate and 84% 2-buten-1-ylacetate. The same mixture was obtained starting with 1-buten-3-yl acetate.

EXAMPLE 35

A mixture of 1.0 g. 3-octa-1,7-dienol, 0.6 g. water, 1.5 g. N,N,N',N'-tetramethyl1,3-butanediamine, 0.076 g. palladium acetylacetonate, 0.18 g. of triphenylphosphine and 10 ml. of dioxane were heated at 100° C. for three hours and yielded 1-octa-2,7-dienol.

EXAMPLE 36

A mixture of 1.0 g. of 3-octa-1,7-dienol, 0.6 g. of water, 1.5 g. of N,N,N',N'-tetramethyl - 1,3 - butanediamine, 0.8 g. of carbon dioxide, 0.075 g. of palladium acetylacetonate, and 0.18 g. of triphenylphosphine was heated at 100° C. for one hour to yield 1-octa-2,7-dienol.

EXAMPLE 37

A mixture of 1 g. of 3-octa-1,7-dienol, 0.6 g. of water, 10 ml. of t-butanol, 0.077 g. of palladium acetylacetonate, 0.182 g. of triphenyl phosphine, and 0.8 g. carbon dioxide was heated at 100° C. for 6 hours to give an octadienol mixture containing 55 percent 1-octa-2,7-dienol and 45 percent 3-octa-1,7-dienol.

EXAMPLE 38

A mixture of 1 g. of 1-octa-2,7-dienol, 0.6 g. of water, 10 ml. of t-butanol, 0.077 g. of palladium acetylacetonate, and 0.18 g. of triphenylphosphine was heated at 100° C. for 20 hours and 3-octa-1,7-dienol was observed.

EXAMPLE 39

A mixture of 1.8 g. of 1-octa-2,7-dienylacetate, 1.7 g. of N,N-dimethylethanolamine, 1.5 g. of acetic acid, 0.015 g. of palladium acetylacetonate, and 0.013 g. of triphenylphosphine was allowed to stand at room temperature for 1.25 hours, then 8.8 g. of ethanol was added and the reaction run at 85° C. for 18 hours to yield 1-ethoxy-2,7-octadiene.

EXAMPLE 40

This run was made using a crude reaction product from the reaction of 4 moles of butadiene with 4 moles of acetic acid in the presence of 4 moles of N-methylmorpholine catalyzed by 3 mmoles of palladium acetylacetonate and 3 mmoles of triphenylphosphine.

A mixture of 100 g. of the above reaction mixture containing octadienylacetate and 500 ml. of a 20 percent potassium hydroxide solution in 50 percent aqueous ethanol was stirred at room temperature for one hour. After further treatment with water and extraction with ethyl ether, the reaction yielded 73 percent 1-ethoxy-2,7-octadiene.

EXAMPLE 41

A mixture of 1 ml. of allylacetate, 1.5 ml. of dimethylethanolamine, 1.5 ml. of acetic acid, 0.007 g. of palladium acetylacetonate, and 0.025 g. of triphenylphosphine was treated with 12 ml. of a solution of 20 percent potassium hydroxide in 50 percent aqueous ethanol. After two hours, a significant amount of allylethylether was observed. A similar exchange using only ethanol (no potassium hydroxide or water) also yielded allylethylether.

EXAMPLE 42

A mixture or 50 g. of 1,H,1,H-pentadecafluorooctanol, 15 g. of allyl alcohol, 0.30 g. of palladium acetylacetonate, and 0.76 g. of triphenylphosphine was headed at 80–85° C. for 5–6 hrs. to yield allyl-1,H,1,H-pentadecafluoroacetyl ether. The product was identified by its NMR spectrum.

EXAMPLE 43

A mixture of 50 mmoles of 1-acetoxy-2,7-octadiene, 50 mmoles of diethylamine, 0.25 mmoles of palladium acetylacetonate and 0.25 mmoles of triphenylphosphine was heated at 50° C. for 30 minutes and yielded 95 percent 1-octa-2,7-dienyldiethylamine.

EXAMPLE 44

A mixture of 50 mmoles of allylacetate, 50 mmoles of diethylamine, 0.25 mmoles of palladium acetylacetonate and 0.25 mmoles of triphenylphosphine were heated at room temperature for 30 minutes and yielded greater than 95 percent allyldiethylamine.

EXAMPLE 45

This experiment was run using a crude reaction product from the reaction of 4 moles of butadie ne with 4 moles of acetic acid in the presence of 4 moles, of N-methylmorpholine catalyzed by 3 mmoles of palladium acetylacetonate and 3 mmoles of triphenylphosphine.

To 50 g. of the above crude reaction product was added 250 g. of morpholine and the mixture heated on a steam bath for 7 hours. The yield of N-(1-octa-2,7-difunctionally substituted alkyl group, such as hydroxymethyl, ethoxymethyl, phenoxymethyl, hydroxyethyl, hydroxypentyl, acetoxymethyl, acetoxypentyl and the like. These phosphites can be visualized as being derived as the products of esterification of phosphorus acid $((HO)_3P)$ with triols of the general formula $R-C-(CH_2OH)_3$. Phosphites derived in this manner from alcohols of the general formula $R-C-(CR'_2OH)_3$ where R' is some other carbon containing radical or a hydrogen are also useful modifiers in this system.

Another type of bicyclic phosphite that is useful includes those compounds of the general type shown below where R and R' can be hydroxyl, alkyl, aryl, alkoxy or aryloxy, as described for R above.

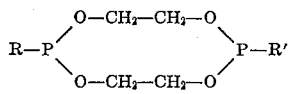

Other phosphites that are useful modifiers are the triarylphosphites, e.g., triphenylphosphite, tri(p-chlorophenyl)-phosphite, tri(1-naphthyl)-phosphite and the like. Mixed alkylarylphosphites can be prepared and used. Because of the methods of synthesis and the relatively facile exchange of groups, it is difficult to prepare discrete compounds in high yield; the mixtures are suitable for use as modifiers if so desired.

Because of considerations, such as solubility, it may be advantageous to use mixtures of various hydrocarbylphosphines, for example, mixtures of phosphines and/or arsines and/or phosphites.

These modifiers may be added to the reaction mixture in quantities such that the ratio of the total number of moles of modifiers of all kinds (whether added as components of the palladium or platinum catalyst or added separately) to palladium, platinum can vary, for example, from 200:1 and higher and 1:10 and lower, preferably from 50:1 to 0.2:1, most preferably from 20:1 to 1:1.

The catalyst is employed in catalytically significant quantities. A catalyst concentration in the range from about 0.000001 molar and lower to about one molar and higher is suitable. A catalyst concentration in the range from about 0.0001 to about 0.1 molar is preferred. For optimum results the nature of the reactants, the operative conditions under which the reaction is conducted, the solvent characteristics, and other factors, will largely determine the desired catalyst concentration.

The reaction can be conducted with the catalyst absorbed on a solid support, e.g., silica, alumina, silica-alumina, asbestos, activated carbon and the like. The supported catalyst may be used as a heterogeneous catalyst in a liquid phase reaction, in a trickling phase reactor, in which one or more of the reactants may be introduced as a gas, and if the physical properties of all the components of the reaction mixture are suitable, it may be used in a gas phase reaction. The amount of catalyst on the support can be varied over a wide range, e.g., 0.001 to 10 weight percent of the catalyst based on the weight of the catalyst and support.

The isomerization and exchange experiments can be carried out at temperatures from $-20$ to $200°$ C. although the temperature is not a critical part of the invention. Preferred reaction temperatures are $20°$ C. to $180°$ C. with $30°$ C. to $130°$ C. being the most desirable. The reactions can be carried out at autogeneous pressures, or higher, if desired, as well as at atmospheric pressure or below if it presents any advantages. After the reaction, the organic products may be recovered by any technique known to those skilled in the art and the catalyst recycled for further use.

The molar ratios that can be used for the allylic isomerization reactions can vary widely and are not the most critical part of the invention. For instance, the octadienyl carboxylate to carboxylic acid ratio can vary from having no carboxylic acid present to 1:1000 or higher with ratios of 1:50 to 1 to 0.2 being preferred. The ratio of gram-atoms of nitrogen in a tertiary amine to carboxylic acid present can vary from having no amine present to 50:1 or more with ratios of 10:1 to 1:20 being preferred.

The molar ratios that can be used in the isomerization of octadienols can also vary widely and are not considered the most critical part of the invention. The octadienol to water ratio can vary from having no water present to 1:1000 or more if a suitable solvent is used to mutually dissolve this ratio. The reaction can also be run as a heterogeneous system and the mixture vigorously stirred to insure adequate contact of the reagents. The preferred ratios are 1:50 to 1 to 0.2. The use of carbon dioxide to assist this isomerization has been demonstrated. The ratio of octadienol to carbon dioxide can vary from having no carbon dioxide present to 1:50 or more with ratios of 1:10 to 20:1 being preferred. The ratio of gram-atoms of nitrogen in a tertiary amine to the amount of carbon dioxide present can vary from having no amine present to 1:50 or lower and 50:1 or higher with 1:10 to 10:1 being preferred.

In the allylic exchange reactions with, for example, octadienylcarboxylates and alcohols, the molar ratio of the substituent XH to the octadienyl-derivative is not highly critical. The ratio can vary from 1000:1 or more to 1:1000 or less with the preferred ratios being 50:1 to 1:50. Other ratios, such as amine to acid, etc., are the same as those given for the isomerization experiments.

The following examples are given to illustrate the invention and are not intended to outline the overall limitation of the reactions.

The isomerization data for the octadienyl acetates is given in Table I (Examples 1–32).

TABLE I.—ALLYLIC ISOMERIZATION OF OCTADIENYL ACETATES AT 100° C.

| Example No. | HOAc | DMEA [a] | Weight Pd(AcAc)$_2$ [b] | Grams PPh$_3$ | Other | 1-octa-2, 7-dienyl acetate | 3-octa-1, 7-dienyl acetate | Equilibration time (hr.) [c] |
|---|---|---|---|---|---|---|---|---|
| 1 | 1.5 | 1.5 | | | | 2.0 | | N.r. |
| 2 | 1.5 | 1.5 | | | | | 3.0 | N.r. |
| 3 | 1.5 | 1.5 | 0.015 | 0.013 | | | 3.0 | 2 |
| 4 | 1.5 | 1.5 | 0.015 | 0.013 | | | 1.0 | 1 |
| 5 | 1.5 | 1.5 | 0.015 | 0.013 | | 3.0 | | 1 |
| 6 | 6.0 | | 0.015 | 0.013 | [d] 0.75 | | 1.0 | >4 |
| 7 | 3.0 | | 0.015 | 0.052 | | 3.0 | | 3 |
| 8 | 3.0 | | 0.015 | 0.013 | | | 3.0 | >4 |
| 9 | 1.5 | 1.5 | 0.015 | 0.052 | | | 3.0 | 1 |
| 10 | 1.5 | | 0.015 | 0.013 | [e] 1.5 | | 3.0 | 5 |
| 11 | 1.5 | 1.5 | 0.015 | 0.006 | | | 3.0 | >2 |
| 12 | 1.8 | 1.5 | 0.015 | 0.013 | | | 3.0 | 2 |
| 13 | 1.5 | 1.5 | 0.015 | 0.013 | [f] 0.5 | | 3.0 | 2 |
| 14 | 1.5 | 1.5 | 0.015 | 0.013 | | | 1.0 | 0.5 |
| 15 | 1.5 | 1.5 | 0.015 | 0.113 | | 1.0 | | 2 |
| 16 | 0.5 | 2.5 | 0.015 | 0.013 | | | 3.0 | 1 |
| 17 | 0.5 | 2.5 | 0.015 | 0.013 | | | 0.5 | 1 |
| 18 | 1.5 | 1.5 | 0.015 | 0.013 | | | 0.5 | 0.5 |
| 19 | 1.5 | 1.5 | 0.007 | 0.026 | | | 1.5 | >4 |
| 20 | 1.5 | 1.8 | 0.015 | | [g] 0.018 | 1.2 | | >2 |
| 21 | 1.5 | 1.5 | 0.015 | | [g] 0.018 | | 1.0 | >2 |
| 22 | 1.5 | 1.5 | 0.015 | | [g] 0.006 | | 1.0 | 20 |
| 23 | 1.5 | 1.5 | 0.015 | | [g] 0.006 | 1.0 | | >20 | enyl)morpholine was 87 percent based on the octadienylacetate originally present.

EXAMPLE 46

To 50 g. of the crude reaction mixture described above (Example 46) was added 160 g. of a 23 percent aqueous potassium hydroxide solution and 140 g. of morpholine. This mixture was stirred at room temperature for 3.5 hours and treated with water followed by an ether extraction. The reaction product contained 90 percent N-(1-octa-2,7-dienyl)morpholine and 10 percent 1-octa-2,7-dienol.

EXAMPLE 47

A mixture of 0.12 moles of butadiene, 0.10 mole of diethylamine, 0.5 mmole of palladium acetylacetonate, and 1.0 mmole of triphenylphosphine were reacted at 95° C. for 20 hours. The conversion of butadiene was 50 percent and the efficiency to 1-octa-2,7-dienyldiethylamine and to octatriene was 87.6 percent and 12.4 percent, respectively.

EXAMPLE 48

A mixture of 0.10 moles of butadiene, 0.10 mole of diethylamine, 0.10 mole of acetic acid, 0.25 mmole of palladium acetylacetonate, 0.25 mmole of triphenylphosphine were reacted for 30 minutes at 85° C. The conversion of butadiene was 100 percent and the yield of 1-octa-2,7-dienyldiethylamine was essentially quantitative.

EXAMPLE 49

A mixture of 0.05 mole of octa-2,7-dien-1-yl acetate, 0.013 mole of n-butylamine, 0.25 mmole of palladium acetylacetonate, and 0.75 mmole of triphenylphosphine was heated at 85° C. for two hours. The yield of N,N-bis(octa-2,7-dien-1-yl) butylamine was greater than 95 percent. Only traces of N-octa-2,7-dien-1-yl butylamine were noted.

EXAMPLE 50

A mixture of 0.05 mole of octa-2,7-dien-1-yl acetate, 0.05 mole of n-butylamine, 0.25 mmole of palladium acetylacetonate, and 0.75 mmole of triphenylphosphine was heated at 85° C. for two hours. The yield of N,N-bis(octa-2,7-dien-1yl) butylamine was 83 percent and the yield of N-octa-2,7-dien-1-yl butylamine was 17 percent.

EXAMPLE 51

A mixture of 5.0 moles of 1,4-but-2-endiol, 3.1 moles of diethylamine, 11 mmoles of palladium acetylacetonate, and 33 mmoles of triphenylphosphine was heated at 85° C. for four hours give a 34 percent yield of 4-(N,N-diethylamino)but-2-en-ol, B.P. 110°/9 mm.

EXAMPLE 52

A mixture of 1.0 g. of butadiene, 0.8 g. carbon dioxide, 10 ml. of dioxane, 0.076 g. palladium acetylacetonate, 0.18 g. of triphenylphosphine, and 1.3 g. of diethylamine were heated at 85° C. for 3.5 hours to give a 38 percent yield of diethyl octa-2,7-dien-1-ylamine was observed. Only traces of octadienol were present.

EXAMPLE 53

A mixture of 1.0 g. of 3-octa-1,7-dienylacetate, 1.5 g. of N,N-dimethylethanolamine, 1.85 g. of propionic acid, 0.015 g. of palladium acetylacetonate, and 0.013 g. of triphenylphosphine were heated at 100° C. for 1 hour to yield 87 percent octadienyl-propionates (75:25 1-octa-2,7-dienylpropionate:3-octa-1,7-dienylpropionate).

EXAMPLE 54

An identical run to Example 54 was made except the N,N-dimethylethanolamine was omitted. Within 1 hour the exchange was complete to give 84 percent of the octadienylpropionates. The isomer ratio was the same as given above.

EXAMPLE 55

To a mixture of 1.5 g. of N,N-dimethylethanolamine and 1.85 g. of propionic acid was added 0.015 g. of palladium acetylacetonate and 0.013 g. of triphenylphosphine followed by 1.0 g. allylacetate. This material was heated to 95° C. for 50 minutes to yield 77 percent allylpropionate.

The reactions of compounds containing activated carbon-hydrogen bonds with allylic esters, allylic alcohols, and allylic amines are outlined in Tables II (Examples 57–62), Table III (Examples 62–68) and Table IV (Examples 69–73), respectively.

EXAMPLE 74

A mixture of 0.02 mole of octa-2,7-dien-1-yl ethyl ether, 0.05 mole of 2,4-pentanedione, 0.25 mmole of palladium acetylacetonate, and 0.75 mmole of triphenylphosphine was heated at 85° C. for five hours and yielded 3-(octa-2,7-dien-1-yl)-2,4-pentanedione.

EXAMPLE 75

A mixture of 0.013 mole of allyl ethyl ether, 0.03 mole of 2,4-pentanedione, 0.13 mmole of palladium acetylacetone, and 0.39 mmole of triphenylphosphine was heated at 85° C. for five hours to yield 39 percent 3-allyl-2,4-pentanedione and one percent of 3,3-bis-allyl-2,4-pentanedione.

TABLE II.—REACTIONS OF ALLYLIC ESTERS WITH 2,4-PENTANEDIONE

| Example No. | Ester | Charge, moles | | Mmoles | | Time (hrs.) | Temp., ° C. | Percent yield | |
|---|---|---|---|---|---|---|---|---|---|
| | | Ester | Dione | Pd[1] | Φ₃P | | | Mono[2] | Di[3] |
| 56 | ⌐⌐⌐—OAc | 0.025 | 0.050 | 0.25 | 0.25 | 1.0 / 10.0 | 85 | 12 / 82 | 5 |
| 57 | Same as above | 0.025 | 0.050 | 0.25 | 0.75 | 1.0 / 10.0 | 85 | 33 / 77 | 2 / 8 |
| 58 | do | [4]0.025 | 0.050 | 0.25 | 0.25 | 1.0 / 10.0 | 85 | 29 / 60 | 3 / 6 |
| 59 | do | [4]0.025 | 0.050 | 0.25 | 0.75 | 1.0 | 85 | 73 | 15 |
| 60 | ⌐⌐OAc | 0.025 | 0.050 | 0.25 | 0.75 | 1.0 / 6.0 | 85 | 37 / 46 | 4 / 15 |
| 61 | Same as above | [4]0.025 | 0.050 | 0.25 | 0.75 | 1.0 | 85 | 66 | 18 |

[1] Charged as palladium acetylacetonate.
[2] Represents either 3,3-(octa-2.7-dien-1-yl)-2,4-pentanedione or 3,3-bis(allyl)-2,4-pentanedione, depending on starting ester.
[3] Represents either 3,3-bis(octa-2,7-dien-1-yl)-2,4-pentanedione or 3,3-bis(allyl)-2,4-pentanedione, depending on starting ester.
[4] N-methylmorpholine (0.025 mole) also present.

TABLE III.—REACTION OF ALLYLIC ALCOHOLS WITH 2,4-PENTANEDIONE

| Example No. | Alcohol | Charge, moles | | Mmoles | | Time (hrs.) | Temp., °C. | Percent yield | |
|---|---|---|---|---|---|---|---|---|---|
| | | Alcohol | Dione | Pd[1] | Φ₃P | | | Mono[2] | Di[3] |
| 62 | ⌇OH | 0.043 | 0.050 | 0.25 | 0.75 | 3.0 | 85 | 70 | 26 |
| 63 | Same as above | [4]0.043 | 0.050 | 0.25 | 0.75 | 3.0 | 85 | 51 | 17 |
| 64 | do | 0.86 | 1.0 | 5.1 | 14.5 | {1.75 / 3.0} | 85 | {24 / 64} | {5 / 23} |
| 65 | (structure with OH) | 0.024 | 0.050 | 0.25 | 0.75 | 3.0 | 85 | [5]35 | |
| 66 | (structure with OH) | 0.024 | 0.050 | 0.25 | 0.75 | 3.0 | 85 | | |
| 67 | HO—H₂C—CH=CH—CH₂OH | 1.0 | 5.0 | 12.0 | 36.0 | 3.0 | 85 | | ([6]) |
| 68 | ⌇⌇⌇—OH | 0.024 | [7]0.051 | 0.025 | 0.50 | 20.0 | 85 | 15 | |

[1] Charged as palladium acetylacetonate.
[2] Either 3-(octa-2,7-dien-1-yl)-2,4-pentanedione or 3-allyl-2,4-pentanedione, depending on starting alcohol.
[3] Either 3,3-bis(octa-2,7-dien-1-yl)-2,4-pentanedione or 3,3-bis(allyl)-2,4-pentanedione depending on starting alcohol.
[4] N-methylmorpholine (0.025 mole) also charged to the reaction.
[5] Product was 3-(octa-2,7-dien-1-yl)-2,4-pentanedione.
[6] A 29 percent yield of the bis enol form of 1,1,6,6-tetraacetylhex-3-ene was obtained (B.P. 160°/0.3 mm.) and identified by its infrared and nuclear magnetic resonance spectra and elemental analysis.
[7] Phenylacetonitrile used in place of 2,4-pentanedione.

TABLE IV.—EXCHANGE RXS OF ALLYLIC AMINES WITH 2,4-PENTANEDIONE

| Example No. | Amine | Moles | | Mmoles | | Temp., °C. | Time (hrs.) | Percent yield [1] | |
|---|---|---|---|---|---|---|---|---|---|
| | | Amine | Dione | Pd | φ₃P | | | Mono-allyl | Diallyl |
| 69 | (⌇)₃N | 0.05 | 0.06 | 0.24 | 0.72 | 85 | [2]ON | 28 | 19 |
| 70 | ⌇—NEt₂ | 0.10 | 0.03 | 0.24 | 0.72 | {85 / 85} | {2.0 / [2]ON} | {19 / 34} | {2 / 29} |
| 71 | Same as above | 0.5 | 0.6 | 2.4 | 7.2 | 85 | [2]ON | 70 | 20 |
| 72 | (⌇)₂NH | 1.0 | 1.2 | 2.4 | 7.2 | 85 | 4.0 | 20 | Nil |
| 73 | ⌇⌇⌇—NEt₂ | 0.022 | 0.06 | 0.25 | 0.75 | 85 | 20 | 70 | 26 |

[1] In the case of the allyl derivatives, the products are mono and bis 3,3-allyl-2,4-pentanedione. With octadienyl amines the products are mono and bis 3,3,-(octa-2,7-dien-1-yl)-2,4-pentanedione. As in the other exchange reactions, small amounts of 3-(octa-1,7-dien-3-yl)-2,4-pentanedione were observed.
[2] ON=overnight.

What is claimed is:

1. Process for making octadienyl substituted compounds which comprises reacting in the presence of a palladium catalyst complex with triphenylphosphine an octadienyl ester selected from the group consisting of 1-octa-2,7-dienylacetate and 3-octa-1,7-diethylacetate with a compound containing two active hydrogen atoms selected from the group consisting of 2,4-pentanedione, ethylacetoacetate, and phenylacetonitrile and causing the octadienyl acetate to react with said compound to form octadienyl substituted derivatives in which the octadienyl group is substituted for one or both of the active hydrogen atom of said compound.

2. Process as claimed in claim 1 in which the compound containing the two active hydrogen atoms is 2,4-pentanedione.

References Cited
FOREIGN PATENTS 1,807,491   6/1969   Germany ———————— 260—593 R
596,634   8/1959   Italy ———————— 260—593 R DANIEL D. HORWITZ, Primary Examiner U.S. Cl. X.R.

252—430, 437; 260—247, 348 R, 410, 410.9 R, 465 R, 466, 483, 488 H, 577, 567.6 R, 583 H, 590, 565.9, 586 R, 601 R, 641 R, 632, 641, 642, 594

UNITED STATES PATENT OFFICE
CERTIFICATE OF CORRECTION

Patent No. 3,755,451   Dated August 28, 1973

Inventor(s) Kurtz et al.

It is certified that error appears in the above-identified patent and that said Letters Patent are hereby corrected as shown below:

Column 1, line 16, "2-octa-" should read -- 3-octa- --; line 41, "preferably" should read -- preferable --; line 48, "anl" should read -- and --. Column 2, line 42, "condition" should read -- conditions --; line 50, after "triethyl" read -- ether --. Column 3, line 29, "$K_b$—" should read -- $K_b=$ --. Column 4, line 47, "use" should read -- used --. Column 5, line 2, "ally cycohexyl" should read -- allyl cyclohexyl --; line 30, "phenylalyamine" should read -- phenylallylamine --; line 53, "benidine" should read -- benzidine --. Column 6, line 40, "alkanolic" should read -- alkanoic --; line 57, "presented" should read -- represented --. Column 7, line 27, "malonitrile" should read -- malononitrile --. Column 8, line 11, "cayanide" should read -- cyanide --. Columns 9-10, Table I, opposite Example No. 7 and under the heading "Equilibration time", "3" should read -- 4 --; opposite Example No. 15 and under the heading "Grams", "0.113" should read -- 0.013 --. Columns 11-12, Table I, opposite Example No. 25 and under the heading "Weight", "0.115" should read -- 0.015 --; opposite Example No. 28 and under the heading "Equilibration time", before ">24", read footnote reference -- j --; opposite Example No. 29 and under the heading "Equilibration time", footnote reference "1" should read -- j --. Column 13, line 5, "46" should read -- 45 --. Column 14, line 18, "54" should read -- 53 --; line 34, "57-62" should read -- 56-61 --. Columns 15-16, opposite Example No. 68 and under the heading "Pd", "0.025" should read -- 0.25 --. Column 15, line 51, "diethylacetate" should read -- dienylacetate --.

Signed and sealed this 2nd day of July 1974.

(SEAL)
Attest:

EDWARD M. FLETCHER, JR.
Attesting Officer

C. MARSHALL DANN
Commissioner of Patents